(12) United States Patent
Derouin et al.

(10) Patent No.: US 6,537,145 B1
(45) Date of Patent: Mar. 25, 2003

(54) HEAD GATE ASSEMBLY FOR RESTRAINING LIVESTOCK

(75) Inventors: Kenneth L. "Buck" Derouin, DePere, WI (US); Jay A. Parizek, Green Bay, WI (US); Bryan M. Kleczka, Suamico, WI (US); Frank F. Stuckart, Green Bay, WI (US); Danny G. Klaus, Green Bay, WI (US)

(73) Assignee: American Foods Group, Green Bay, WI (US)

(*) Notice: Subject to any disclaimer, the term of this patent is extended or adjusted under 35 U.S.C. 154(b) by 0 days.

(21) Appl. No.: 10/125,557

(22) Filed: Apr. 18, 2002

(51) Int. Cl.$^7$ .............................. A22B 1/00; A22B 5/02; A22B 5/06
(52) U.S. Cl. ......................... 452/54; 119/729; 119/737
(58) Field of Search ........................... 452/54; 119/729, 119/734, 735, 737, 712

(56) References Cited

U.S. PATENT DOCUMENTS

| | | | |
|---|---|---|---|
| 3,092,871 A | | 6/1963 | Marshall et al. |
| 3,113,340 A | * | 12/1963 | Bush et al. .................. 452/54 |
| 3,572,295 A | * | 3/1971 | Tansel ........................ 119/730 |
| 4,357,906 A | | 11/1982 | Kratky |
| 4,716,625 A | | 1/1988 | Nijhuis |
| 5,070,818 A | | 12/1991 | Gearn et al. |
| 5,263,438 A | | 11/1993 | Cummings |
| 5,908,009 A | | 6/1999 | Cummings |

OTHER PUBLICATIONS

"Ritual Slaughter", JAVMA, vol. 204, No. 9, May, 1994, Public Veterinary Medicine: Food Safety and Handling, p. 1358.

Proceedings from "Restraint of Livestock", Animal Behavior and the Design of Livestock and Poultry Systems International Conference, Indianapolis, IN (Apr. 19–21, 1995) pp. 1–14.

"Recommended Ritual Slaughter Practices to Improve Animal Welfare and Employee Safety", Website http://www.grandin.com/ritual/ritual.slaughter.tips.html (Jan. 31, 2002) pp. 1–4.

"Conveyor Restrainer Systems", Website http://www.grandin.com/ritual/conv.sys.html (Jan. 31, 2002) pp. 1–4.

* cited by examiner

Primary Examiner—Charles T. Jordan
Assistant Examiner—Judith A. Nelson
(74) Attorney, Agent, or Firm—Reinhart Boerner Van Deuren, s.c.

(57) ABSTRACT

A head gate assembly for restraining the head of an animal during ritual and humane slaughter includes first and second head gates including sliding plate supported for relative sliding movement between restraining and release positions. Each head gate includes a chin lift arm and a pivot assembly mounting the chin lift arm to the associated sliding plate. Each pivot assembly includes a bushing block welded to the associated sliding plate. The bushing block carries a bushing and pivot pin that is received in a mounting portion defined on the end of the chin lift arm. A neck restraint includes a neck tube supported by a support disposed to be located rearwardly of the head of, and in non-contacting relation with the neck of, an animal being restrained by the head gate assembly, maximizing access to a rearward portion of the head of the animal to facilitate stunning of the animal.

19 Claims, 7 Drawing Sheets

HEAD GATE ASSEMBLY FOR RESTRAINING LIVESTOCK

BACKGROUND OF THE INVENTION

This invention relates to livestock restraint devices for use in livestock slaughter and meat packing plants, and more particularly, to a head gate assembly for restraining the heads of animals, such as beef cattle and calves, during humane and ritual slaughter.

Large meat packing plants use a variety of restraint mechanisms for conveying animals from a holding area to a slaughter area and for holding animals during stunning and slaughter. Proper operation of the restraint mechanisms is essential for good animal welfare. There are federal standards for the humane slaughter of meat animals, such as beef cattle and calves for example.

Restraint mechanisms are designed to apply enough pressure to the animal to allow the animal to feel restrained while avoiding the use of excessive pressure which would cause the animal to experience pain. Typically, restraint mechanisms that have moving parts that press against the animal include pressure limiting valves to prevent discomfort by automatically preventing the application of excessive pressure. Moreover, when the restraint mechanism used includes a head restraint, the animal should be stunned or ritually slaughtered immediately after the head is restrained.

Ritual slaughter is slaughter performed according to the dietary codes of Jews or Muslims. Cattle and calves are exsanguinated by a throat cut by a rabbi without first being rendered unconscious by pre-slaughter stunning. Some restraint mechanisms include a headholder to restrain the head of the animal during the throat cutting operation.

One restraint mechanism that provides for humane restraint of livestock, such as cattle and calves, for example, during transport and slaughter is commonly referred to as the double rail conveyor restrainer. The double rail conveyor restrainer effectively immobilizes the animal in an upright position. When used in ritual slaughter process, typically, the double rail conveyor restrainer includes a headholder designed to raise the head of the animal to expose the throat of the animal. In addition, the conveyor restrainer can include solid sides that block outside distractions and prevent animals from seeing people deep inside their flight zone. Such conveyor restrainers can include a solid hold down over the entrance that is long enough to block the animal's vision until the rear feet of the animal are off the entrance ramp and the animal is completely settled down on the rails of the double rail conveyor.

One conveyor restrainer system, which is intended for ritual slaughter, is disclosed in an article entitled "Conveyor Restraint Systems", which was available at least as of Jan. 31, 2002, at a Web site www.grandin.com/ritual/conv.sys.html. The conveyor restrainer system includes a headholder mounted on a double rail conveyor. The headholder includes a pair of bifurcated chin lift bars which are located on opposite sides of the head of an animal being restrained. The proximal end of each chin lift bar is pivotally mounted to a sliding gate by a pivot assembly which includes a pair of pillow block bearings which are affixed to the sliding gate by fasteners such as screws or bolts. The bearing assemblies define pivots for the chin lift bars. The distal ends of the chin lift bars are formed with projections that form a cradle for the head of the animal being restrained. The chin lift bars are connected by chains to a sliding panel that is driven by a pneumatic cylinder which permits the chin lift bars to be lifted together. Although the chin lift bars adequately restrain the head of an animal, it has been found that the pivot assemblies fail after relatively short periods of use because of the particular pivot devices that are used in the prior art headholder and the manner in which the pivot devices are affixed to the sliding gates.

The headholder further includes a neck restraint, including a neck tube and a forehead plate. The neck tube prevents an animal being restrained from pulling its head out of the headholder. The forehead plate projects forwardly of the neck tube and engages the forward of the animal for limiting movement of the head of the animal when chin bars are lifted. In known neck restraints, the forehead plate extends over the head and engages the forehead of the animal, substantially covering the head of the animal. This significantly restricts access to the head of the animal as is required to permit stunning of the animal immediately after the throat cutting operation has been carried out. Accordingly, restraint apparatus that is used in humane slaughter processes other than ritual slaughter, generally does not include a head restraint. Thus, large packing plants generally require two different types of restraint systems, a restraint system including a headholder for ritual slaughter and a restraint system without a headholder for humane slaughter.

SUMMARY OF THE INVENTION

The present invention provides a head gate assembly for restraining the head of an animal during processing of the animal, including during both humane and ritual slaughter processes. The head gate assembly includes first and second head gates including first and second sliding plates, respectively, supported for relative sliding movement between restraining and release positions. The sliding plates define an opening for the head of the animal. The first head gate includes a first chin lift arm and a first pivot assembly mounting the first chin lift arm to the first sliding plate. The second head gate includes a second chin lift arm and a second pivot assembly mounting the first chin lift arm to the second sliding plate. A chin lift mechanism is coupled to the chin lift arms for pivoting the chin lift arms relative to the first and second sliding plates. A neck restraint, which is supported in overlying relation with the opening, includes a support and a neck tube supported by the support. The support has a forward end disposed to be located rearwardly of the head of, and in non-contacting relation with the neck of, an animal being restrained by the head gate assembly, maximizing access to a rearward portion of the head of the animal. The neck restraint is movable between a lowered position in which the neck tube engages the neck of the animal and a raised position in which the neck tube is out of contact with the animal.

Further in accordance with the invention, there is provided a head gate assembly for restraining the head of an animal during processing of the animal, including during both humane and ritual slaughter processes. The head gate assembly includes first and second head gates including first and second sliding plates, respectively, supported for relative sliding movement between restraining and release positions. The first head gate includes a first chin lift arm and a first pivot assembly mounting the first chin lift arm to the first sliding plate. The second head gate includes a second chin lift arm and a second pivot assembly mounting the first chin lift arm to the second sliding plate. The first pivot assembly includes a first bushing block attached to the first sliding plate, a bushing carried by the first bushing block, and a first pivot pin carried by the bushing. The proximal end of the first chin lift arm is mounted on the first pivot pin. The second pivot assembly includes a second bushing block attached to the second sliding plate, a bushing carried by the second bushing block, and a second pivot pin carried by the bushing. The proximal end of the second chin lift arm is mounted on the second pivot pin. A chin lift mechanism is coupled to the chin lift arms for pivoting the chin lift arms relative to the first and second sliding plates.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DETAILED DESCRIPTION OF THE PREFERRED EMBODIMENTS

Figure 1:
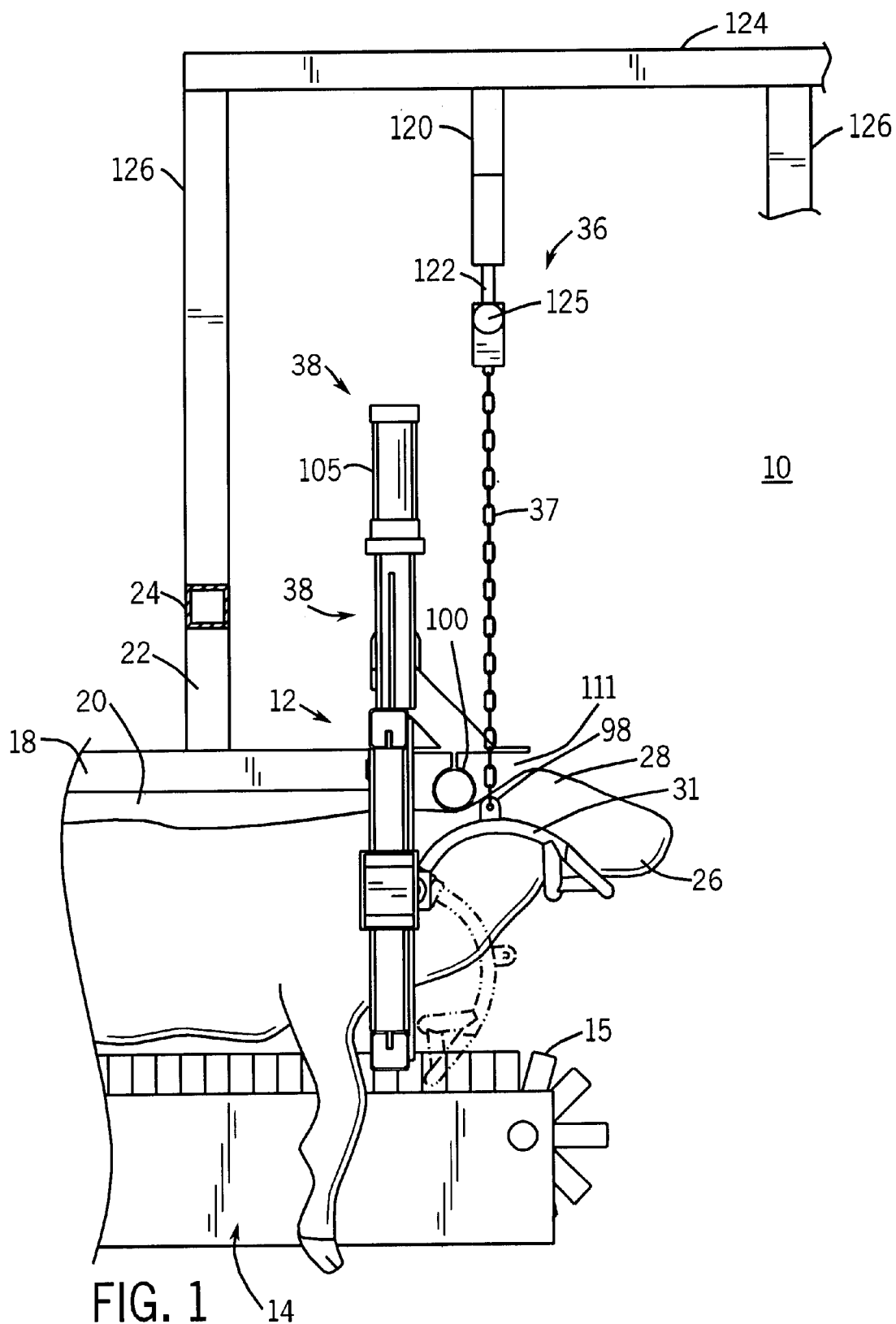
FIG. 1 is a side elevation view of a double rail conveyor restrainer including a head gate assembly in accordance with the invention.
Figure 2:
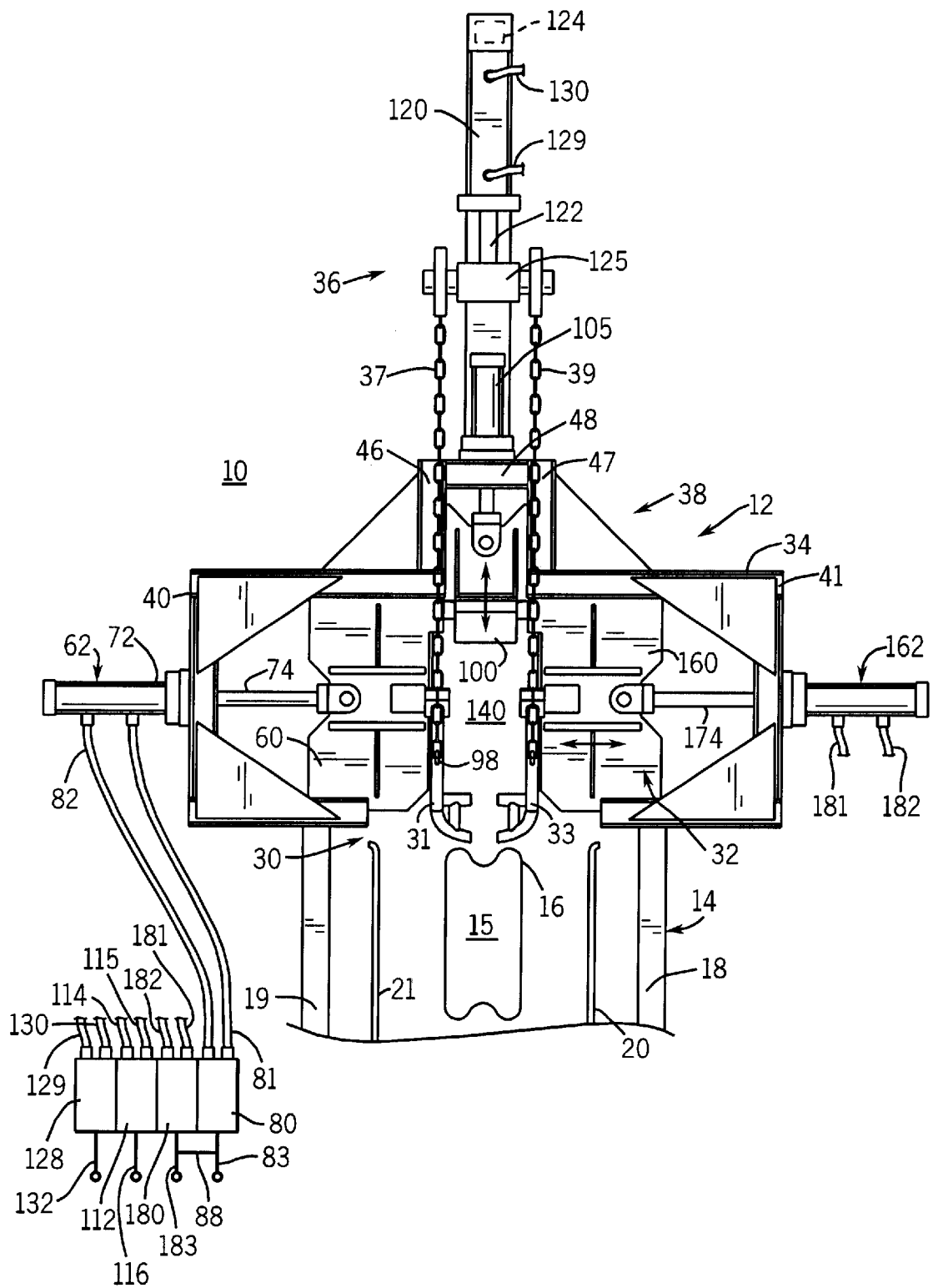
FIG. 2 is a front elevation view of the double rail conveyor restrainer and head gate assembly of FIG. 1, and with the head gate assembly shown in the closed condition.

Referring to the drawings, FIGS. 1 and 2 illustrate an animal restraint system 10 incorporating a head gate assembly 12 in accordance with the present invention. In one embodiment, the animal restraint system 10 includes a double rail conveyor restrainer 14 including a double rail conveyor 15 with a moving double rail 16 for transporting livestock, such as beef cattle and calves, from a holding area to a location for slaughter, for example. The slaughter process can be ritual slaughter wherein the animal is restrained while the throat of the animal is slit by a rabbi, followed by stunning of the animal, or humane slaughter wherein the animal is restrained while the animal is stunned prior to slaughter. Moreover, although the animal restraint system 10 is described with reference to applications for humane and ritual slaughter, the animal restraint system 10 also an be used to restrain an animal during a process of medical treatment for the animal. Moreover, the head gate assembly 12 can be used independently of the conveyor restrainer, particularly for restraining the head of an animal during medical treatment.

Although the head gate assembly 12 is described with reference to an application for beef cattle and calves, with suitable modification, the head gate assembly of the present invention can be used for restraining other livestock. The head gate assembly 12 is mounted to the double rail conveyor restrainer 14 at its end and is adapted to receive and restrain the head 26 of an animal at the slaughtering area.

Figure 6:
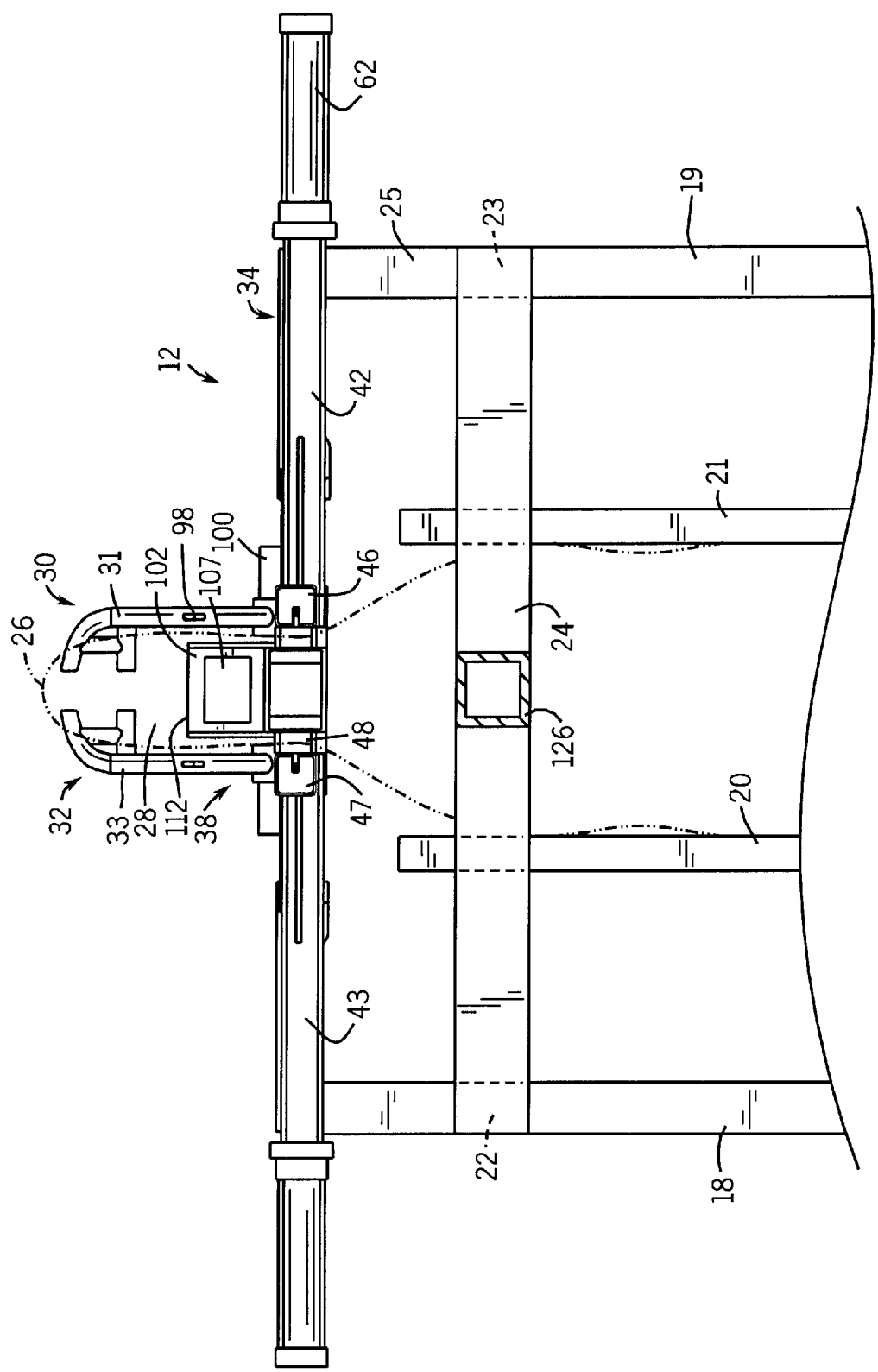
FIG. 6 is a top plan view of the head gate assembly showing the neck plate.

Referring also to FIG. 6, double rail conveyor restrainers are known in the art and accordingly, the double rail conveyor restrainer 14 is not described in detail herein. Briefly, the double rail conveyor restrainer 14 can include fixed solid sides 18 and 19 located on opposite sides of the double rail conveyor 15 and adjustable sides 20 and 21 interposed between the fixed sides and the double rail conveyor 15. The fixed sides 18 and 19 block outside distractions and prevent animals from seeing people deep inside their flight zone. The fixed sides can be interconnected by one or more frame structures, such as frame structure 25, which includes vertical beams 22 and 23 and a cross beam 24, as shown in FIG. 6, forming a rigid frame structure for the double rail conveyor restrainer 14. The adjustable sides 20 and 21 are adapted to engage the sides of an animal and hold the animal on the double rail conveyor restrainer 14 as is known. The double rail conveyor restrainer 14 can include a solid hold down over the entrance to the restrainer that is long enough to block the animal's vision until the animal's rear feet are off the entrance ramp and the animal is completely settled down on the moving double rail 16 of the double rail conveyor 15, as is known.

Figure 3:
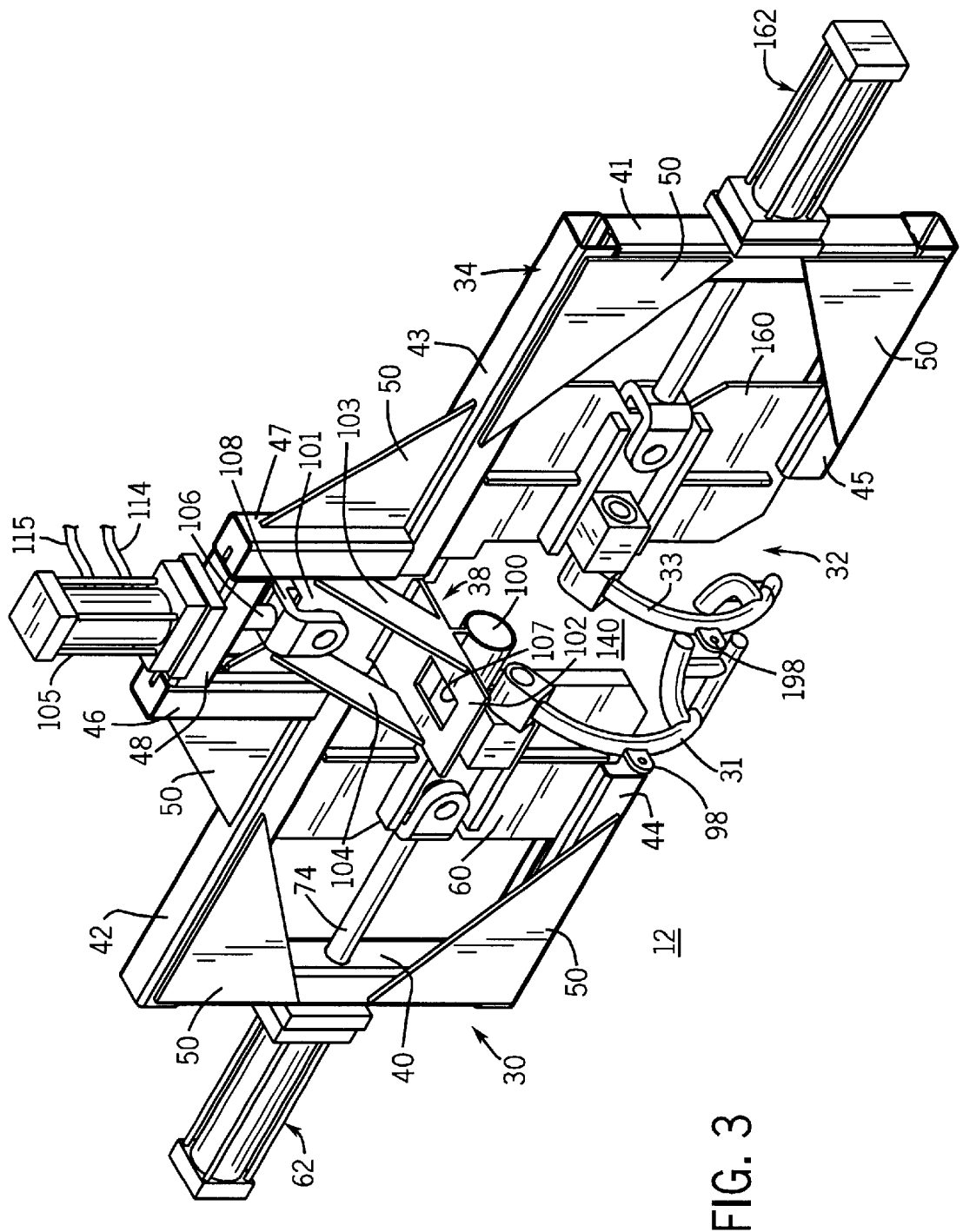
FIG. 3 is an isometric view of the head gate assembly provided by the present invention, shown in the closed condition.

Referring to FIGS. 1–3, the head gate assembly 12 includes a left head gate 30 which carries a left side chin arm 31, a right head gate 32 which carries a right side chin arm 33, and a support frame 34 which supports the left and right slide gates. The head gate assembly 12 further includes a lift chain mechanism 36 including lift chains 37 and 39 for raising the chin lift arms, and a neck restraint 38 which is supported by the support frame 34 rearwardly of the crown 28 of the head 26 of an animal being restrained.

The support frame 34 includes left and right vertically extending side rails 40 and 41, top rails 42 and 43 and bottom rails 44 and 45. The support frame further includes vertical rails 46 and 47 and a cross rail 48 which interconnect which the top rails 42 and 43 and which support the neck restraint 38. Because of the substantial weight and strength of the cattle or calves being restrained, the support frame 34 is constructed of box beams of relatively heavy gauge steel which has relatively no give or deflection. Other components of the head gate assembly 12 also are constructed of relatively heavy gauge steel. The support frame 34 can include a plurality of gusset plates 50 connected between adjacent members for added strength.

In one embodiment, the support frame 34 is mounted to the rigid frame of the double rail conveyor restrainer 14. Preferably, the side rails 40 and 41 are welded to the rigid frame structure for the double rail conveyor restrainer 14.

Figure 4:
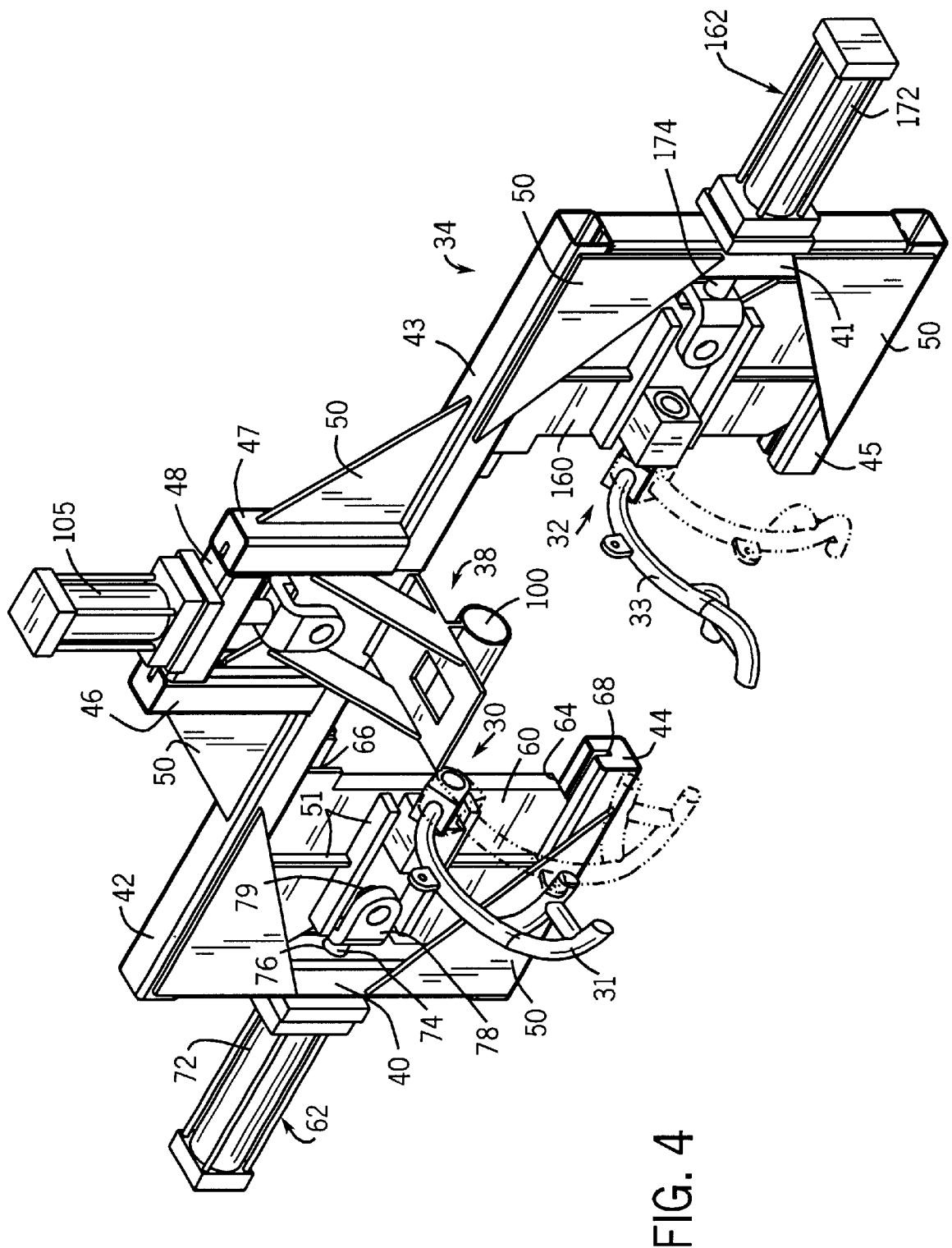
FIG. 4 is a view similar to that of FIG. 3 with the head gate assembly shown in the open position and with the chin lift arms shown raised.

The left head gate 30 includes a slide plate 60 and a drive cylinder 62 for reciprocating the slide plate 60 between a closed position, illustrated in FIG. 3, and an open position, illustrated in FIG. 4. The slide plate 60 is thin and flat and preferably is of steel. The lower edge 64 and the upper edge 66 of the slide plate 60 ride in grooves, such as groove 68, in opposing surfaces of the bottom and top rails 44 and 42 as shown in FIG. 4. The slide plate 60 can include a plurality of ribs 51 for added strength.

In one embodiment, the drive cylinder 62 that moves the left head gate 30 is a double acting drive cylinder having a cylinder housing 72 and a rod 74 which extends from the cylinder housing. The cylinder housing 72 is mounted to the side rail 40 of the support frame 20 in any suitable manner, such as through the use of machine bolts and nuts. The rod 74 extends through an aperture 76 in the side rail 40 and is coupled to the slide plate 60. In one embodiment, the distal end 78 of the rod 74 includes a clevis to facilitate coupling the rod to the slide plate. The slide plate 60 includes an aperture 79 at one side to which the clevis end 78 is pinned.

The drive cylinder 62 is actuated by a hydraulic or pneumatic source. A control valve 80, illustrated in FIG. 2, controls the supply of hydraulic fluid (or pressurized air) to the drive cylinder 62. The outlets of the control valve 80 are connected to the drive cylinder 62 by two hoses, one hose 81 connected to a rod end port of the drive cylinder 62 and the other hose 82 connected to a port at the opposite end of the drive cylinder 62. A control lever 83 is manually operated by an operator to extend or retract the rod 74 to thereby move the left head gate 30 between closed and open positions. In one embodiment, the rod 74 of the drive cylinder 62 can have a two inch stroke.

Figure 7:
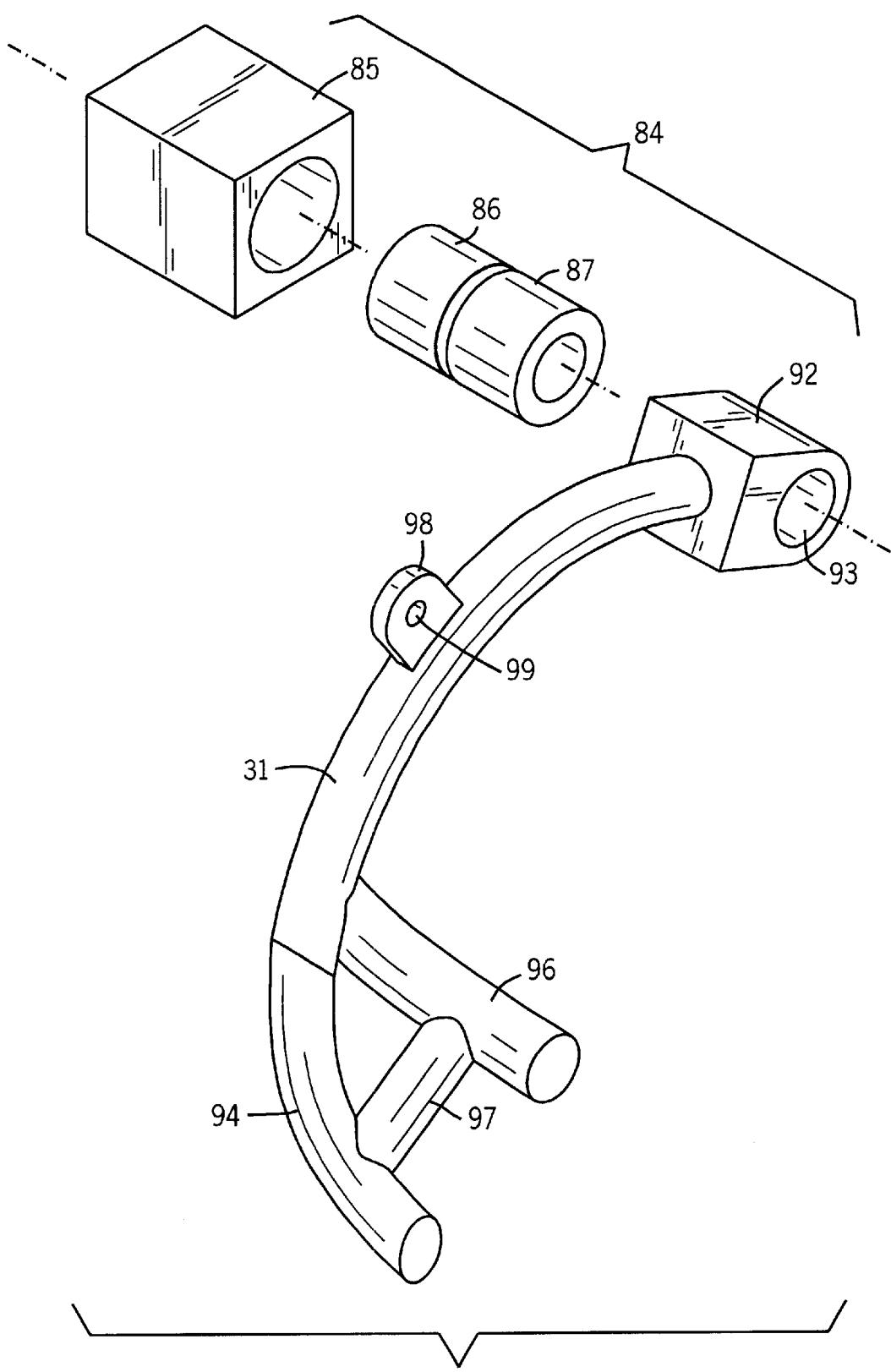
FIG. 7 is an exploded isometric view of the left-hand chin lift bar assembly of the head gate assembly of FIG. 3.

Referring also to FIG. 7, each chin lift arm, such as chin lift arm 31, is pivotally mounted to the associated slide plate by a pivot assembly, such as pivot assembly 84 for chin lift arm 31. The pivot assembly 84 includes a bushing block 85 which carries a bushing 86. Preferably, the bushing block 84 is welded to the slide plate 60. The pivot assembly 82 further includes a shaft or pivot pin 87, one end of which extends through the bushing 86 and is pinned thereto. The other end of the pivot pin 87 extends through a bore 93 in a mounting portion 92 of the chin lift arm 31.

The inventor has determined that tilting the head of a large animal, such as a cow, can result in large forces on the mechanism that allows the chin lift arms to pivot in lifting the head of the animal. The prior art pivot assemblies that use one or more pillow block bearings for pivoting the chin lift arms fail after relatively short periods of use, because of the particular pivot devices that are used and because the pillow block bearings are affixed to the sliding gates using fasteners such as screws or bolts. The chin lift arm pivot assembly 84 provided by the invention is stronger than that afforded by known lift chin pivot arrangements.

The chin lift arm 31 is arcuate in shape and is curved inwardly from its proximal end at the pivot assembly to it distal end. The proximal end of the chin lift arm 31 includes mounting portion 92 which is formed with bore 93. The distal end of the chin lift arm 31 terminates in a curved tip 94. The chin lift arm 31 further includes a curved finger portion 96 that is attached to the chin lift arm 31 near the curved tip 94 and a straight portion 98 extending between the curved tip 94 and the curved finger portion 96. Preferably, the curved finger portion 96 and the straight portion 97 are welded to the chin lift arm 31. In one embodiment, the mounting portion 92 is a separate element that is welded to the proximal end of the chin lift arm 31. The chin lift arm 31 includes a lug 98 on the upper surface of the chin lift arm 31 near the center thereof. The lug 98 includes an aperture 99 to facilitate attachment of one end of the lift chain 37 to the chin lift arm 31.

Referring to FIGS. 2, 3 and 6, the right head gate 30 is the mirror image of the left head gate 30 and the right chin lift arm 33 is the mirror image of the left chin lift arm 31. Accordingly, elements of the right head gate 30 and elements of the right chin lift arm 33 have been given the same reference numerals as the same or similar elements of the left head gate 30 and the left chin lift arm 31, respectively, but with the numerals incremented by "100".

Thus, briefly, the right slide gate 30 includes a slide plate 160 and a drive cylinder 162 that moves the gate 30, the drive cylinder 162 also being a double acting drive cylinder having a cylinder housing 172 and a rod 174. The cylinder housing 172 is mounted to the side rail 41 of the support frame 20 and is the rod 174 is coupled to the slide plate 160. A control valve 180 controls the supply of hydraulic fluid (or pressurized air) to the drive cylinder 162. The outlets of the control valve 180 are connected to the drive cylinder 162 by two hoses, one hose 181 connected to a rod end port of the drive cylinder 162 and the other hose 182 connected to a port at the opposite end of the drive cylinder 162. A control lever 183 is manually operated by an operator to extend or retract the rod 174 to thereby move the right head gate between closed and open positions. In one embodiment, the rod 174 of the drive cylinder 162 can have a two inch stroke.

Figure 5:
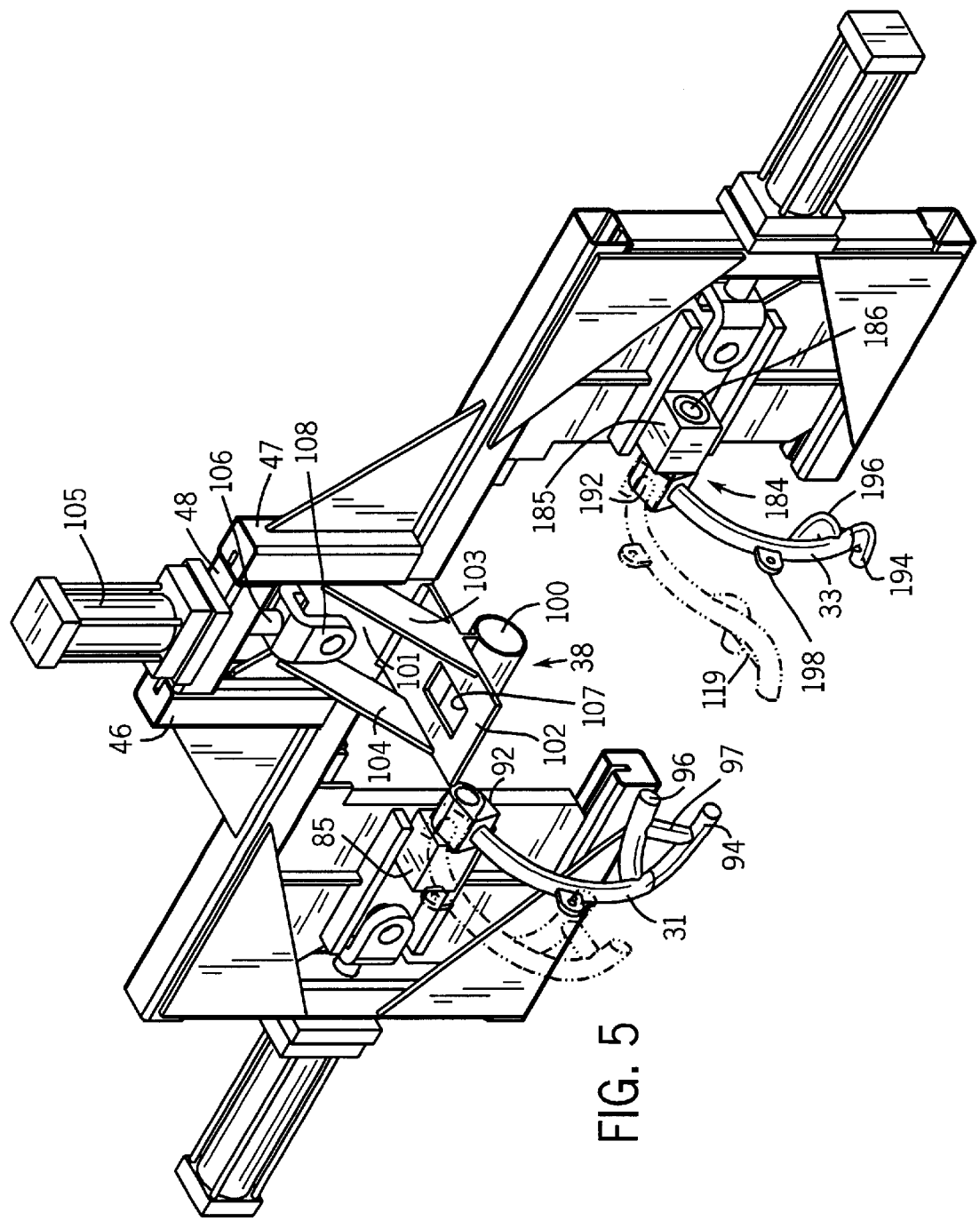
FIG. 5 is a view similar to that of FIG. 4 with and with the chin lift arms shown lowered.

Referring also to FIG. 5, chin lift arm 33 is arcuate in shape and is curved inwardly from its proximal end at the pivot assembly to its distal end. The proximal end of the chin lift arm 33 includes mounting portion 192 by which the chin lift arm 33 is pivotally mounted to the slide plate 160 by a pivot assembly 184 including bushing block 185 and bushing 186. The bushing block 184 is welded to the slide plate 160. The distal end of the chin lift arm 33 terminates in a curved tip 194, with curved finger portion 196 and straight portion 197. The chin lift arm 33 includes a lug 198 on the upper surface of the chin lift arm 33 near the center thereof. The lug 198 includes an aperture 199 to facilitate attachment of one end of the lift chain 39 to the chin lift arm 33.

Referring to FIGS. 1–3 and 5, and to FIG. 4, which is a view similar to that of FIG. 5 and with the chin lift arms raised, the neck restraint 38 includes a neck tube 100 which is supported by support plates 101 and 102 in an overlying relationship with the neck of an animal the head of which is being restrained by the head gate assembly 12. The support plate 101 is oriented generally vertically and is mounted to rails 46 and 47 for vertical reciprocating movement between a use position shown in FIG. 3 and a retracted position shown in FIG. 4. The support plate 102 is oriented generally horizontally and is supported in cantilever fashion by support plate 101 and struts 103 and 104. In one embodiment, both support plates are generally rectangular in shape. However, the support plates can be other shapes. Support plate 102 carries the neck tube 100 on its lower surface. The neck tube 100 can be fixed to the lower surface of support plate 102 in any suitable manner, and preferably by welding. In one embodiment, the support plate 102 includes an aperture 107 to minimize the area at the back portion of an animal's head 26 that is covered by the plate 102. The forward edge 111 of the support plate 102 is located rearwardly of the crown 28 the animal's head 26 shown in FIGS. 1 and 6, defining an open area. The open area 113 forward of the support plate 102 and the opening 107 in plate 102 of the neck restraint 38. This effectively increases access to the rearward portion of an animal's head to allow the operator room to locate the tip of a stunning device (not shown) that is used to stun the animal after the animal's throat has been cut by a rabbi during ritual slaughtering, or to stun an animal during humane slaughter.

The neck restraint 38 further includes a drive cylinder 105 which is mounted on the cross rail 48 and which is coupled to the support plate 101. The drive cylinder 105 has rod 106 with a clevis end 108 that is coupled to the support plate 101 near the upper edge thereof. The neck tube 100 is lowered onto the neck of the animal to prevent the animal from pulling its head out of the head gate assembly 12. In one embodiment, the rod 106 of the drive cylinder 105 has a four inch stroke. A control valve 112 controls the supply of hydraulic fluid (or pressurized air) to the drive cylinder 105. Referring also to FIG. 3, the outlets of the control valve 112 are connected to the drive cylinder 105 by two hoses, one hose 114 connected to a rod end port of the drive cylinder 105 and the other hose 115 connected to a port at the opposite end of the drive cylinder 105. A control lever 116 is manually operated by the operator for operating the control valve 112 to control the operation of the drive cylinder 105.

Referring to FIGS. 1 and 2, the lift chains 37 and 39 of the lift chain mechanism 36 are suspended from a shaft 125 which is turn is coupled to the rod 122 of the drive cylinder 120. In one embodiment, the lift chains 37 and 39 are secured to opposite ends of the shaft 125 which is carried by the rod 122 at one end thereof. In one embodiment, the drive cylinder 120 is mounted to a horizontally extending beam 124 that is supported through spaced-apart, vertically extending beams 126 of the rigid frame of the dual conveyor restrainer 14. Because the lift chains 37 and 39 are directly attached to the rod 122 of the drive cylinder 120, and no plate-like guide is used, frictional forces are substantially eliminated and better control is afforded for the chin lift mechanism. This can minimize discomfort for the animal. In one embodiment, the rod 122 of the drive cylinder 120 can have a twenty-four inch stroke. A control valve 128 controls the supply of hydraulic fluid (or pressurized air) to the cylinder. The outlets of the control valve 128 are connected to the drive cylinder 120 by two hoses, one hose 129 connected to a rod end port of the drive cylinder 120 and the other hose 130 connected to a port at the opposite end of the drive cylinder 120. A control lever 132 is manually operated by the operator to extend or retract the rod 122 to thereby lower and raise the chin lift arms 30 and 32 in unison.

The drive cylinders 62, 162, 105 and 120 can be operated hydraulically or pneumatically. Moreover, the drive cylinders 62 and 162 which control the can be operated hydraulically and the drive cylinders which control the neck restraint and raising and lowering of the chin lift bars, can be operated pneumatically. As stated above, the four control valves 80, 180, 112 and 128 each have an associated control lever 83, 183, 116 and 132, respectively, as shown in FIG. 2. A separate control is provided for drive cylinders of the gate assemblies, the drive cylinder of the neck restraint and the drive cylinder of the chin bar lift chains. However, the control levers 83 and 183 for the drive cylinders for the left and right head gates 30 and 32 are ganged together in any suitable manner, as indicated at 88, so that both control valves 80 and 180 operate together such that the left and right head gates 30 and 32 operate in unison and are driven substantially simultaneously inwardly or outwardly the same distance.

Referring to FIGS. 1, 2, 3 and 5, in operation, the head gate assembly 12 initially is set to the open position shown in FIG. 5, with the chin lift arms 31 and 33 in the lowered position, forming a cradle for the head of an animal to be restrained.

Briefly, cattle, for example, walk down an entrance ramp to the restrainer entrance and are caused to straddle a stationary leg spreader bar (not shown) which positions their legs on opposite sides of the moving double rail 16 of the dual rail conveyor restrainer 14. The animal is moved by the double rail conveyor 15 until the animal's head is located adjacent to the head gate assembly 12. The operator then stops the conveyor restrainer 15 and operates the drive cylinders 62 and 162 to move the slide gates 60 and 160 until they gently engage the neck of the animal on opposite sides as shown in FIG. 6. The position of the slide gates 60 and 160 can be adjusted until a desired amount of pressure is being applied to the animal's neck. When in the closed position, the slide gates provide a barrier for an animal at the end of the conveyor restrainer 14, while defining an opening 140, illustrated in FIG. 3, through which projects the head of the animal.

Then, valve 112 is operated to actuate drive cylinder 112 to lower the neck tube 100 to a position just above or into engagement with the neck of the animal as shown in FIG. 1.

Then, valve 128 is operated to actuate the drive cylinder 120 to cause the lift chains 37 and 39 to be raised, lifting the chin lift arms 31 and 33 to be pivoted about respective pivot assemblies 84 and 184, tilting the animal's head upwardly as illustrated in FIG. 1, exposing the neck to facilitate slitting of the animal's throat by the rabbi during ritual slaughtering. Digressing, FIG. 5, which illustrates the head gates in the open position, shows the chin lift bars in the lowered positioned, represented by the solid lines, and in the raised position, represented by the dot dash lines.

Then, in both ritual and humane slaughtering, the tip of a stun gun (not shown) is positioned to stun the animal. The head gate assembly holds the animal's head still during the stunning operation both for humane and ritual slaughter processes. The forward edge of the support plate 102 is located rearwardly of the crown 28 of the animal's head 26 as shown in FIGS. 1 and 6 defining the open area 111. The open area 111 forward of the support plate 102 and the opening 107 in plate 102 of the neck restraint 38 afford access to the animal's head to facilitate stunning of the animal.

As is stated above, the conveyor restrainer 14 is stopped for each animal and the head gate assembly holds the head for the rabbi during ritual slaughtering and holds the animal's head still during stunning in both ritual and humane slaughtering operations. The animal is stunned, or ritually slaughtered and then stunned, immediately after the animal's head is restrained. A shackle can be attached to one rear leg of the animal, as is known, preferably while the conveyor is stopped. The shackle trolley subsequently is moved by a moving inclined shackle conveyor which moves the stunned animal to the bleed area.

Then, the drive cylinder 120 is operated to release the lift chains 37 and 39, allowing the chin lift arms to drop down to the position shown in FIG. 3. The drive cylinder 112 is operated to raise the neck restraint. Then, the valves 80 and 180 are operated simultaneously to retract the head gates 31 and 33 to the position illustrated in FIG. 5, and the double rail conveyor 15 of the conveyor restrainer 14 is moved to allow the stunned animal to pass through the head gates and to be hoisted onto the dressing conveyor. In the open position, the slide plates 60 and 160 and the chin lift bars 30 and 32 are retracted past the inner sides 20 and 21 of the conveyor restrainer 14 (FIG. 6) to provide clearance for the animal when the animal is discharged from the conveyor restrainer 14. The head gates 30 and 32 are maintained in the open position, FIG. 5, and the system is ready for processing the next animal.

While preferred embodiments have been illustrated and described, it should be understood that changes and modifications can be made thereto without departing from the invention in its broadest aspects. Various features of the invention are defined in the following claims.

What is claimed is:

1. A head gate assembly for restraining the head of an animal during processing of the animal, said head gate assembly comprising:

first and second head gates including first and second sliding plates, respectively, supported for relative sliding movement between restraining and release positions, the sliding plates defining an opening for the head of the animal;

the first head gate including a first chin lift arm and a first pivot assembly mounting the first chin lift arm to the first sliding plate, the second head gate including a second chin lift arm and a second pivot assembly mounting the first chin lift arm to the second sliding plate;

a chin lift mechanism coupled to the chin lift arms for pivoting the chin lift arms relative to the first and second sliding plates; and a neck restraint supported in overlying relation with the opening, the neck restraint including a support and a neck tube supported by the support, the support having a forward end disposed to be located rearwardly of the head of, and in non-contacting relation with the neck of, an animal being restrained by the head gate assembly, maximizing access to a rearward portion of the head of the animal, the neck restraint movable between a lowered position in which the neck tube engages the neck of the animal and a raised position in which the neck tube is out of contact with the animal.

2. The head gate assembly according to claim 1, wherein the support includes a flat, horizontally oriented support plate, the support plate generally rectangular in shape and having upper and lower surfaces, the support plate having an opening therethrough from said upper surface to said lower surface, the neck tube being attached to the lower surface of the support plate.

3. The head gate assembly according to claim 2, wherein the support includes a further support plate oriented substantially vertically, and including a neck restraint drive mechanism coupled to the further support plate.

4. The head gate assembly according to claim 1, wherein at least the first pivot assembly includes a bushing block attached to the first sliding plate, a bushing carried by the bushing block, and a pivot pin carried by the bushing, the proximal end of the first chin lift arm mounted on the pivot pin.

5. The head gate assembly according to claim 4, wherein the bushing block is welded to the first sliding plate.

6. The head gate assembly according to claim 4, wherein the proximal end of the first chin lift arm includes an enlarged portion defining a mounting portion, the pivot pin being received in a bore in the mounting portion.

7. The head gate assembly according to claim 1, and including a gate drive mechanism for moving the sliding plates between said restraining position and said release position.

8. The head gate assembly according to claim 7, wherein the gate drive mechanism includes a first fluid actuated drive cylinder coupled to the first sliding plate for moving the first sliding plate, a second fluid actuated drive cylinder coupled to the second sliding plate for moving the first sliding plate, and first and second controls for operating the first and second fluid drive cylinders, the first and second controls being coupled together for moving the first and second sliding plates in unison.

9. The head gate assembly according to claim 1, wherein the chin lift mechanism includes a fluid operated drive cylinder having a rod, a tubular member carried by the rod, the tubular member having first and second ends, and first and second lift chains attached to the tubular member near the first and second ends, respectively, the first lift chain attached to the first chin lift arm and the second lift chain attached to the second chin lift arm.

10. A head gate assembly for restraining the head of an animal during processing of the animal, said head gate assembly comprising:

first and second head gates including first and second sliding plates, respectively, the first and second sliding plates being supported for movement relative to one another between restraining and release positions, the sliding plates defining an opening for the head of the animal, and a head gate drive mechanism for moving the sliding plates between said restraining and release positions;

the first head gate including a first chin lift arm, and a first pivot assembly mounting the first chin lift arm to the first sliding plate for pivoting movement, the second head gate including a second chin lift arm, and a second pivot assembly mounting the first chin lift arm to the second sliding plate for pivoting movement;

a chin lift mechanism coupled to the first and second chin lift arms for pivoting the first and second chin lift arms relative to the first and second sliding plates;

a neck restraint supported in overlying relation with said opening, the neck restraint including a neck tube and a support supporting the neck tube, the support having a forward end and a rearward end, said forward end disposed to be located rearwardly of the head and in non-contacting relation with the neck of an animal being restrained by the head gate assembly, maximizing access to the rearward portion of the head of the animal; and a neck restraint drive mechanism for moving the neck restraint substantially vertically between a lowered position in which the neck tube engages the neck of the animal and a raised position in which the neck tube is out of contact with the animal.

11. The head gate assembly according to claim 10, wherein at least the first pivot assembly includes a bushing block attached to the first sliding plate, a bushing carried by the bushing block, and a pivot pin carried by the bushing, the proximal end of the first chin lift arm mounted on the pivot pin.

12. The head gate assembly according to claim 11, wherein the bushing block is welded to the first sliding plate.

13. The head gate assembly according to claim 11, wherein the proximal end of the first chin lift arm includes an enlarged portion defining a mounting portion, the pivot pin being received in a bore in the mounting portion.

14. The head gate assembly according to claim 10, wherein the chin lift mechanism includes a fluid operated drive cylinder having a rod, a tubular member carried by the rod, the tubular member having first and second ends, and first and second lift chains attached to the tubular member near the first and second ends, respectively, the first lift chain attached to the first chin lift arm and the second lift chain attached to the second chin lift arm.

15. A head gate assembly for restraining the head of an animal during processing of the animal, said head gate assembly comprising:

first and second head gates including first and second sliding plates, respectively, supported for relative sliding movement between restraining and release positions, the first head gate including a first chin lift arm and a first pivot assembly mounting the first chin lift arm to the first sliding plate, the second head gate including a second chin lift arm and a second pivot assembly mounting the first chin lift arm to the second sliding plate, the first pivot assembly including a first bushing block attached to the first sliding plate, a bushing carried by the first bushing block, and a first pivot pin carried by the bushing, the proximal end of the first chin lift arm mounted on the first pivot pin, the second pivot assembly including a second bushing block attached to the second sliding plate, a bushing carried by the second bushing block, and a second pivot pin carried by the bushing, the proximal end of the second chin lift arm mounted on the second pivot pin; and a chin lift mechanism coupled to the chin lift arms for pivoting the chin lift arms relative to the first and second sliding plates.

16. The head gate assembly according to claim 15, wherein the first bushing block is welded to the first sliding plate and the second bushing block is welded to the second sliding plate.

17. The head gate assembly according to claim 15, wherein the proximal end of the first chin lift arm includes an enlarged portion defining a first mounting portion, the first pivot pin being received in a bore in the mounting portion, and wherein the proximal end of the second chin lift arm includes an enlarged portion defining a second mounting portion, the second pivot pin being received in a bore in the second mounting portion.

18. The head gate assembly according to claim 15, and including a neck restraint including a neck tube and a support supporting the neck tube, the support having a forward end and a rearward end, said forward end disposed to be located rearwardly of the head of an animal being restrained by the head gate assembly and in non-contacting relation with the neck of the animal, maximizing access to the rearward portion of the head of the animal, and a neck restraint drive mechanism for moving the neck restraint substantially vertically between a lowered position in which the neck tube engages the neck of the animal and a raised position in which the neck tube is out of contact with the animal.

19. The head gate assembly according to claim 18, wherein the support includes a flat, horizontally oriented support plate, the support plate generally rectangular in shape and having upper and lower surfaces, the support plate having an opening therethrough from said upper surface to said lower surface, the neck tube being attached to the lower surface of the support plate.

\* \* \* \* \*